United States Patent [19]

Nixon

[11] Patent Number: 5,057,140
[45] Date of Patent: Oct. 15, 1991

[54] APPARATUS FOR MELTING GLASS BATCH MATERIAL

[75] Inventor: John S. Nixon, Wigan, England

[73] Assignee: Pilkington plc, Merseyside, England

[21] Appl. No.: 579,256

[22] Filed: Sep. 5, 1990

Related U.S. Application Data

[63] Continuation of Ser. No. 356,859, May 25, 1989, abandoned.

[30] Foreign Application Priority Data

Jun. 13, 1988 [GB] United Kingdom ................. 8813925

[51] Int. Cl.$^5$ .............................................. C03B 3/00
[52] U.S. Cl. ........................................ 65/335; 65/135
[58] Field of Search .................... 65/27, 134, 135, 136, 65/335

[56] References Cited

U.S. PATENT DOCUMENTS

| 1,999,761 | 4/1935 | Howard | 65/136 |
| 2,262,070 | 11/1941 | Turk | 65/135 |
| 2,556,467 | 6/1951 | Cannon, Jr. | |
| 4,328,019 | 5/1982 | Dejaiffe et al. | 65/335 X |

FOREIGN PATENT DOCUMENTS

| 236859 | 6/1986 | Fed. Rep. of Germany . |
| 291883 | 6/1928 | United Kingdom . |
| 1320377 | 6/1973 | United Kingdom . |

Primary Examiner—Richard V. Fisher
Assistant Examiner—John J. Bruckner
Attorney, Agent, or Firm—Burns, Doane, Swecker & Mathis

[57] ABSTRACT

An apparatus for melting glass batch material, the apparatus forming glass batch material into a pile having an elongate sloping surface, having a feed device for feeding batch material to an upper part of the pile and a pushing device which is located beneath the feed device to push batch material in the pile towards the elongate sloping surface. There is also disclosed a method of melting glass batch material, the method having the steps of (a) forming glass batch material into a pile having an elongate sloping surface by feeding batch material to an upper part of the pile and pushing batch material in a lower part of the pile towards the elongate sloping surface; and (b) heating the batch material in the elongate sloping surface.

11 Claims, 3 Drawing Sheets

APPARATUS FOR MELTING GLASS BATCH MATERIAL

This application is a continuation of application Ser. No. 356,859, filed May 25, 1989, now abandoned.

BACKGROUND TO THE INVENTION

The present invention relates to an apparatus for and a method of melting glass batch material.

It is known for example from UK-B-291883, to melt batch material for glass by continuously feeding the batch material onto a surface in such manner as to spread the material over the surface in a thin layer to which a continuously advancing movement is imparted. The surface is sloping and the thin layer moves down the surface under the action of gravity.

SUMMARY OF THE INVENTION

The present invention aims to provide an apparatus for and a method of melting glass batch material which can give an improved melt rate of the batch material over the known arrangement.

The present invention provides an apparatus for melting glass batch material, the apparatus including means for forming glass batch material into a pile having an elongate sloping surface, the forming means comprising a feed device for feeding batch material to the pile and a pushing device which is located beneath the feed device and is adapted, in use, to push batch material in the pile towards the elongate sloping surface.

Preferably, the forming means further comprises a wall in which the feed device and the pushing device are disposed, the wall including a step between the feed device and the pushing device. More preferably, a front surface of the step is inclined to the horizontal and forms a sloping surface against which the pile of batch material is, in use, disposed. The pushing device may be a hydraulic ram or a screw feeder which is adapted to supply additional batch material to the pile.

The apparatus may further comprise a batch supplying means for supplying batch material to the feed device, the batch supplying means being disposed above the feed device.

The feed device may comprise a hydraulic ram which is arranged to push glass batch material exiting from the batch supplying means to the pile.

The wall may be substantially planar or substantially conical.

The apparatus may further comprise a second pushing device which is located beneath the said pushing device. Preferably, the second pushing device is separated from the said pushing device by a second step in the wall. Additional pushing devices may be provided in the wall, each pushing device being separated from the or each adjacent pushing device by a respective step in the wall.

The present invention also provides a method of melting glass batch material, the method comprising the steps of:

(a) forming glass batch material into a pile having an elongate sloping surface by feeding batch material to an upper part of the pile and pushing batch material in a lower part of the pile towards the elongate sloping surface; and (b) heating the batch material in the elongate sloping surface.

The method may further comprise supplying batch material to the lower part of the pile.

BRIEF DESCRIPTION OF THE DRAWINGS

Embodiments of the present invention will now be described by way of example only with reference to the accompanying drawings, in which.

DESCRIPTION OF THE PREFERRED EMBODIMENTS

Figure 1:
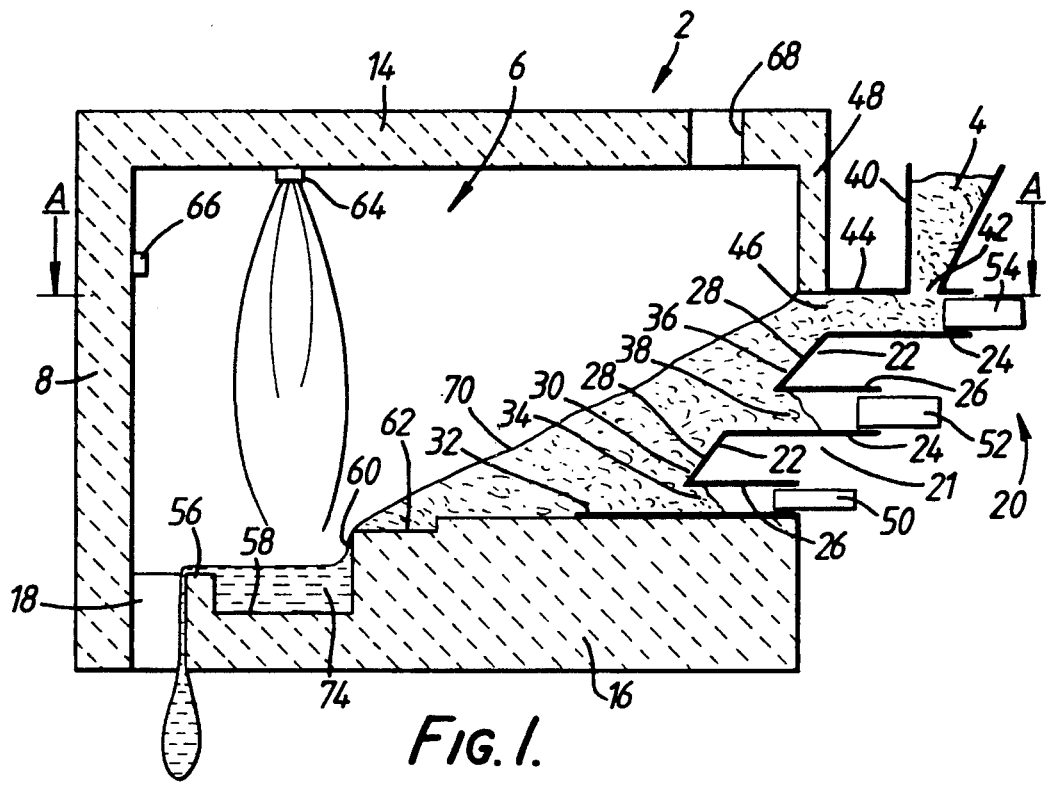
FIG. 1 is a cross-section through an apparatus for melting glass batch material in accordance with a first embodiment of the present invention.
Figure 2:
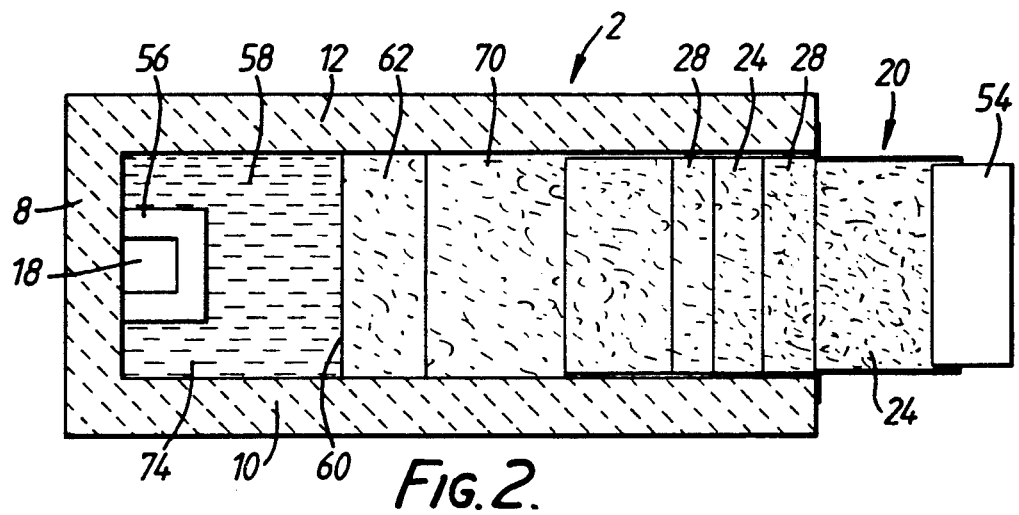
FIG. 2 is a partly cross sectional plan view, taken along line A—A, of the apparatus of FIG. 1.

Referring to FIGS. 1 and 2, a glass batch melting apparatus designated generally as 2, referred to hereinafter as a batch digester 2, for melting glass batch material 4 includes a heating chamber 6 defined by a front end wall 8, two opposed side walls 10, 12, a roof 14 and a floor 16. A drain hole 18 for molten glass is defined between the front end wall 8 and the floor 16. The drain hole 18 exits into a flat glass melting furnace (not shown). A feeding apparatus 20 for feeding the glass batch material 4 into the heating chamber 6 is disposed at the opposite end of the heating chamber 6 from the end wall 8.

The feeding apparatus 20 includes wall 21 formed from a series of steps 22. In the illustrated arrangement there are two steps 22, each of which extends across the width of the heating chamber 6. Each step 22 has upper and lower horizontal surfaces 24, 26 and a front surface 28 which is inclined to the horizontal downwardly in towards the heating chamber 6. The lowest step 30 is vertically spaced above the adjacent upper surface 32 of the floor 16 and defines a lower elongate slot 34 between the lowest step 30 and the floor 16. The adjacent step 36 is vertically spaced above the lowest step 30 thereby to define a middle elongate slot 38 therebetween and is horizontally displaced relative thereto whereby the inclined front surfaces 28 of the steps 30, 36 are substantially aligned. The aligned front surfaces 28 of the steps 30, 36 define a slope over which the glass batch material 4 is fed. A batch supplying means in the form of a batch feed hopper 40 is disposed above the uppermost step 36. The outlet 42 of the batch feed hopper 40 is arranged in an upper wall 44 of the feeding apparatus 20. The upper wall 44 is spaced from the uppermost step 36 and defines an upper elongate slot 46 therebetween. The upper wall 44 engages a rear end wall 48 of the heating chamber 6 which depends from the roof 14.

An elongate hydraulic ram 50, 52, 54 is slidably disposed in each of the respective elongate slots 34, 38, 46. Each ram 50, 52, 54 extends across the full width of the respective slot 34, 38, 46.

The floor 16 of the heating chamber 6 is shaped to provide a weir 56 which surrounds the drain hole 19, the weir 56 being surrounded in turn by a well 58 which in use is filled with a pool of molten glass. The rear edge of the well 58 is defined by an upright wall 60 of the floor 16 which extends transversely across the floor 16. A horizontal transverse sill 62 is disposed above the upright wall 60 and the remainder of the floor 16 consists of the said upper surface 32 of the floor 16, which surface 32 is slightly higher than the sill 62.

A main burner 64 is located below the roof 14 and, in use, directs flames towards the pool of glass in the well 58. A top up burner 66 is located adjacent the front end wall 8. A ventilation hole 68 is provided in the roof 14.

The operation of the batch digester 2 of FIGS. 1 and 2 will now be described. Glass batch material 4 is fed into the heating chamber 6 via the hopper 40. The uppermost hydraulic ram 54 is the upper elongate slot 46 constitutes a feeding device for the batch material 4. The hydraulic ram 54 is reciprocated back and forth in the slot 46 thereby to push the batch material 4 into the heating chamber 6. As the batch material 4 falls by gravity onto the lowest step 30 and onto the floor 16, the middle and lower hydraulic rams 52, 50 are similarly reciprocated in their respective slots 38, 34 and constitute pushing devices which push batch material in towards the heating chamber 6.

The batch material pushing operations of the feeding device and the pushing devices are carried out so that initially the batch material 4 is formed in a controlled manner into a pile of batch material with an elongated sloping surface 70 which extends from the bottom of the rear end wall 48 to the front edge of the sill 62. Once the pile of batch material has been formed in this manner, the burners are operated to melt the batch material to form molten glass.

The main burner 64 directs flames 72 towards the well 58 and this causes the batch material on the elongated sloping surface 70 to melt. The melting batch material flows downwardly into the well 58 in which a pool 74 of molten glass is formed. When the pool 74 reaches the level of the weir 56, molten glass flows over the weir 56 into the body of the flat glass melting furnace (not shown). The pile of batch material is replenished by reciprocating the hydraulic rams. The upper hydraulic ram 54 feeds more batch material into the top of the pile from the hopper 40. The other hydraulic rams 50, 52 act to push batch material, which is in the pile and below the top of the pile, inwardly towards the elongate sloping surface. The hydraulic rams act not only initially to form the elongate sloping surface 70 in a controlled manner but also to maintain the slope configuration during operation of the glass melting apparatus. In this way, a controlled long continuous slope of flowing/melting batch material is formed which passes into the pool 74 under the action of gravity.

The batch digester 2 of FIGS. 1 and 2 was employed in batch material melting test runs. In the test runs, the lower pushing device i.e. hydraulic ram 50 was not operated and only the upper pushing device i.e. hydraulic ram 52 and the feeding device i.e. hydraulic ram 54 were operated. The width of the pile of batch material between the two side walls 10, 12 was approximately 0.6 meters (24 inches) and the distance from the free edge of the sill 62 to the bottom of the rear end well 48, and thereby the length of the elongate slope 70 of the batch material, was approximately 1.4 meters (56 inches). This gave a melt area of the batch material of approximately 0.84 square meters (9 square feed). Four test runs were performed, the furnace temperature being either 1320° C. or 1410° C. and the batch material consisting either entirely of batch raw material or 80% batch raw materials with 20% glass cutlet. For each test run, the weight of glass produced in kilograms per hour was determined. In each case the result was compared with the predicted melt rate in kilograms per hour from a known "flat blanket" glass melting apparatus, such as that described hereinabove, at the same furnace temperature and with same starting materials. The batch material used was a typical flat glass composition. The results are summarised in Table 1 below.

TABLE 1

| FURNACE TEMPERATURE | ALL BATCH FILL | | 20% CULLET FILL | |
|---|---|---|---|---|
| | WT. PREDICTED FLAT BLANKET | ACTUAL WT. BATCH DIGESTER | WT. PREDICTED FLAT BLANKET | ACTUAL WT. BATCH DIGESTER |
| 1320° C. | Comp. Example 1 66 | Example 1 72 | Comp. Example 2 71 | Example 2 97.4 |
| 1410° C. | Comp. Example 3 97 | Example 3 154 | Comp. Example 4 105 | Example 4 182 |

Thus the Examples of the present invention show marked melt rate improvement when compared to the known system, at both test temperatures and for both types of starting materials. It is believed that at temperatures up to 1500° C. melt rate improvements over the known system will be greater than those exemplified at the lower temperatures specified in the Table.

The glass produced in Example 1 was analysed and was found to have the desired composition. Batch carryover into the melt was not observed to be a major problem, and the main burner was fired directly at the glass pool to reduce direct flame impingement of the batch material thus minimising batch carryover.

The load turndown at a given temperature was easily controlled and a 50% turndown achieved, the batch slope 70 simply steepening and the batch melting front retreating along the sill 62.

In FIGS. 1 and 2, although hydraulic rams 50, 52, and 54 are employed, respectively to push and to feed the batch material to form the pile of batch material, it will be understood that other types of material feeders could be used as pushing and feed devices. For example, a screw action feeder could be used. The feeders may be operated either together or independently. Furthermore, additional pushing devices may be provided if desired, each pushing device being separated from an adjacent pushing device or adjacent pushing devices by a respective step or respective steps.

Figure 7:
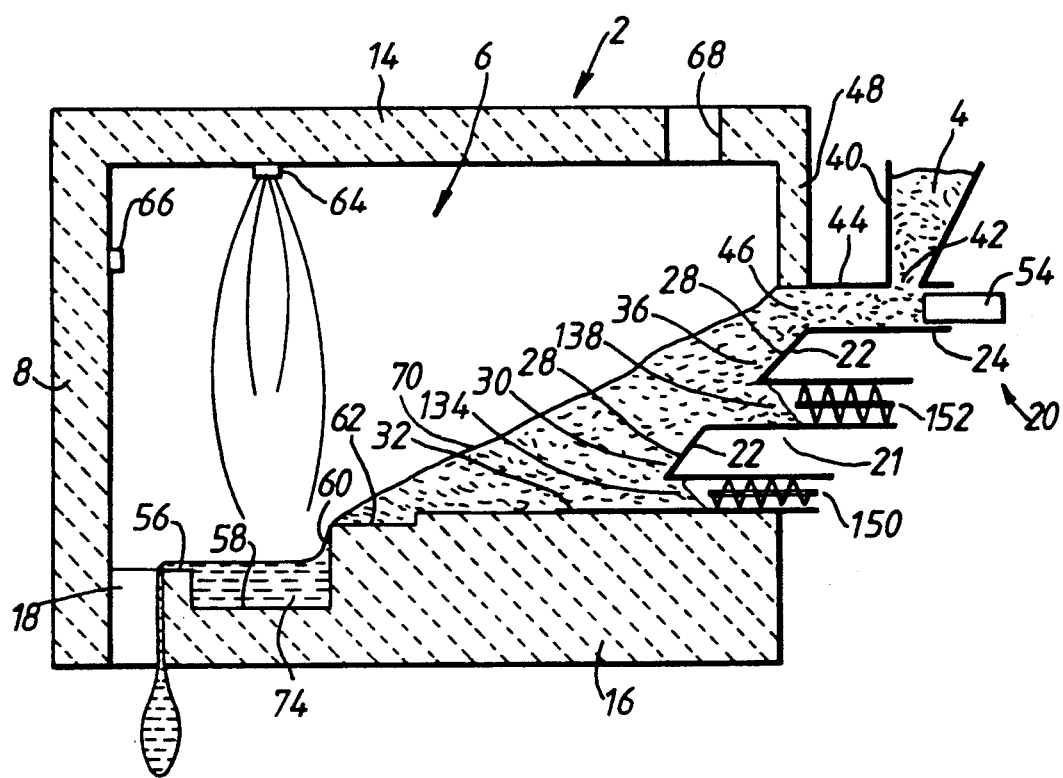
FIG. 7 is a cross section through an apparatus for melting glass batch material in accordance with a fourth embodiment of the present invention.

Furthermore, in the embodiment of FIGS. 1 and 2, batch material is supplied to the apparatus by means of the hopper 4. In an alternative embodiment, the supply of batch material to the apparatus is provided not only by means of the hopper 4, but also by means of screw feeders in place of the hydraulic rams 50, 52. FIG. 7 illustrates such an embodiment which is similar to that of FIGS. 1 and 2, and like parts are indicated by like reference numerals, except that screw feeders 150, 152 are disposed in respective cylindrical channels 134, 138 instead of the haudraulic rams 50, 52 disposed in slots 34, 38. The screw feeders 150, 152 both supply additional batch material to the apparatus and push the supplied batch material in the pile towards the elongate sloping surface.

FIGS. 1 and 2 show a small-scale apparatus and this apparatus can be sized-up for use in a large-scale glass melting operation such as for a float glass plant having a capacity of 2000 Tonnes per week.

Figure 3:
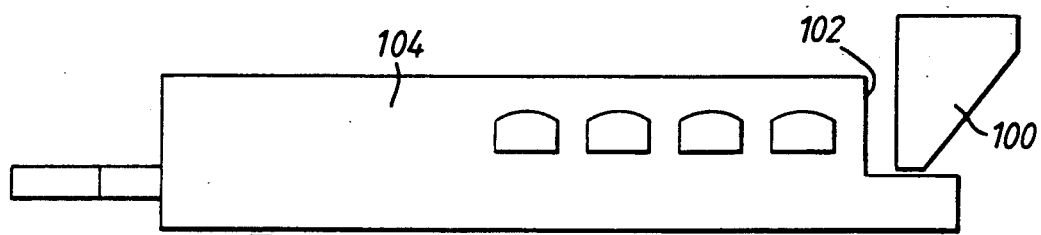
FIG. 3 is a side schematic view of a flat glass melting furnace incorporating an apparatus for melting glass batch material in accordance with a second embodiment of the present invention.
Figure 4:
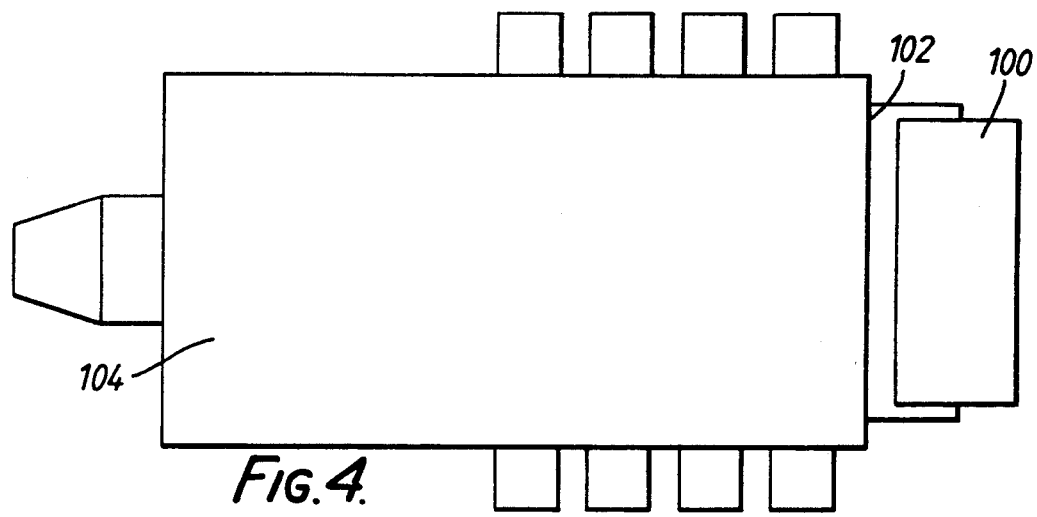
FIG. 4 is a plan schematic view of the flat glass melting furnace of FIG. 3.

FIGS. 3 and 4 are schematic views of a float glass melting furnace incorporating a batch digester similar to that described with reference to FIGS. 1 and 2. The batch digester 100 is located at the upstream end wall 102 of a float glass melting furnace 104 and extends along substantially the full width of the furnace 104. The batch digester 100 is adapted to produce molten glass across the width of the furnace 104. In a typical furnace 104, the batch digester 100 produces molten glass across a width of about 8.2 meters (27 feet). For a batch input of 20% cullet fill, the length of the elongate slope of the pile of batch material would be about 4.3 meters, the height of the pile being about 2.1 meters (7 feet). For a batch input of all raw material batch fill having been preheated to 500° C., the length of the elongate slope of the pile of batch material would be about 3.6 meters, the height of the pile being about 1.8 meters (6 feet).

In this embodiment, the batch digester may be adapted to constitute the upstream end wall of the float glass melting furnace.

Figure 5:
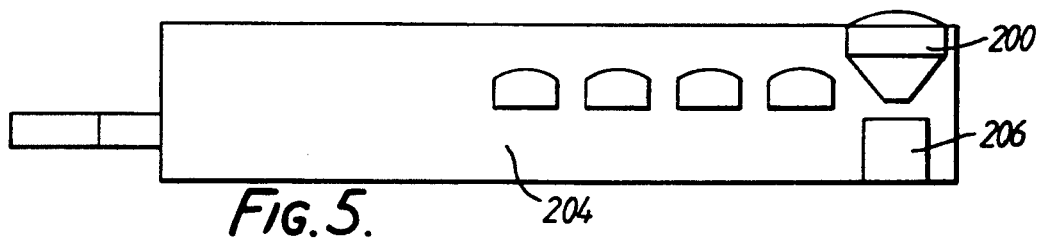
FIG. 5 is a side schematic view of a flat glass melting furnace incorporating an apparatus for melting glass batch material in accordance with a third embodiment of the present invention.
Figure 6:
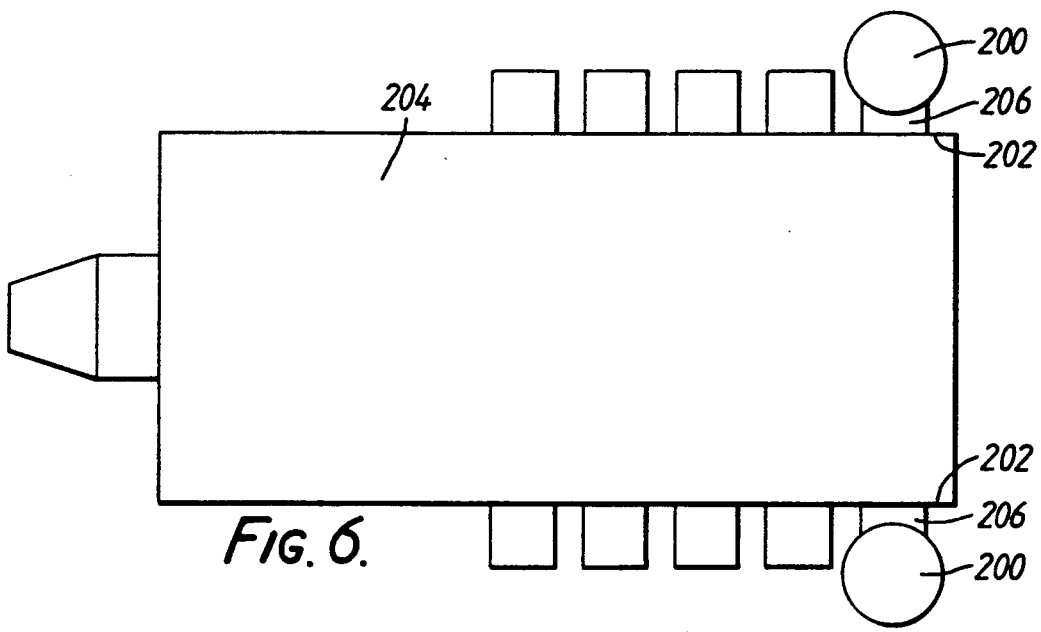
FIG. 6 is a plan schematic view of the flat glass melting furnace of FIG. 5.

FIGS. 5 and 6 are schematic views of an alternative float glass melting furnace incorporating a batch digester. In this arrangement, two batch digesters 200 are employed, each being located at an upstream end of a respective side wall 202 of a float glass melting furnace 204. Each batch digester 200 outputs molten glass into a respective side filling pocket 206 thereby to give "side pocket" filling of the furnace 204. Each batch digester 200 is conical in contrast to the linear batch digesters of the earlier embodiments. In each batch digester, the arrangement is such that the elongate slope of the pile of batch material defines a cone having a 30 degree slope. For a batch input of 20% cullet fill, the cone would have a maximum diameter of about 4.6 meters (15 feet) and a height of about 1.3 meters (51 inches). For a batch input of all raw material batch fill having been preheated to 500° C., the cone would have a maximum diameter of about 4.1 meters (13½ feet) and a height of about 1.1 meters (45 inches).

In this embodiment, the batch digesters may be incorporated into the upstream end wall of the float glass melting furnace.

In the method of the present invention, the batch material may be pre-heated before it is fed into the batch digester in order to enhance the melt rate of the batch material in the batch digester.

Furthermore, optionally the batch material may additionally be fed into the batch digester at any pusher station.

In accordance with the present invention the batch material is fed in to form the pile from below the surface of the pile. This avoids the batch material rolling over down a sloping surface in the glass melting furnace and causing what is known as "carry over", this being the formation of dust particles which then get carried over further into the furnace by gas currents and can result in inclusions of unmelted batch in the final glass product. This provides an advantage over the prior art as exemplified by UK-B-291883 referred to hereinabove wherein batch material is spread out as a thin layer under the action of gravity which can lead to the undesirable "carry over" effect.

What I claim is:

1. Apparatus for melting glass batch material, the apparatus comprising:
   a heating chamber including a floor,
   means for forming and maintaining of glass batch material into a pile having an elongate continuous sloping surface extending in the chamber from the floor to an elevated remote position in the chamber, said forming and maintaining means comprising:
      feeding means disposed remote from the floor to feed glass batch material into the heating chamber by feeding batch material into the pile in the chamber, and
      at least one pushing means disposed beneath the feeding means to push batch material which is in the pile toward the elongate continuous sloping surface,
   burner means located and operable to melt the batch material along the elongate continuous sloping surface to cause the melting batch material to flow downwardly onto the floor,
   the feeding means and pushing means being operable to replenish the pile from behind the elongate sloping surface to maintain the slope configuration during melting and establish a continuous flow of melting batch material which passes along the sloping surface onto the floor.

2. An apparatus according to claim 1 wherein the forming and maintaining means further comprises a wall in which the feeding means and the pushing means are disposed, the wall including a step between the feeding means and the pushing means.

3. An apparatus according to claim 2 wherein a front surface of the step is inclined to the horizontal and forms a sloping surface against which the pile of batch material is, in use, disposed.

4. An apparatus according to claim 2 wherein the wall is substantially planar.

5. An apparatus according to claim 2 wherein the wall is substantially conical.

6. An apparatus according to claim 2 wherein the pushing means comprises two pushing devices located one beneath the other.

7. An apparatus according to claim 6 wherein the two pushing devices are separated from each other by a second step in the wall.

8. An apparatus according to claim 1 wherein the pushing means is a hydraulic ram.

9. An apparatus according to claim 1 wherein the pushing means is a screw feeder which is adapted to supply additional batch material to the pile.

10. An apparatus according to claim 1 further comprising batch supplying means for supplying batch material to the feeding means, the batch supplying means being disposed above the feeding means.

11. An apparatus according to claim 10 wherein the feeding means comprises a hydraulic ram which is arranged to push glass batch material exiting from the batch supplying means to the pile.

* * * * *